(12) United States Patent  
Lippert (10) Patent No.: US 9,915,321 B2  
(45) Date of Patent: Mar. 13, 2018

(54) MULTI-SPEED TRANSMISSION

(71) Applicant: Ford Global Technologies, LLC, Dearborn, MI (US)

(72) Inventor: Robert Scott Lippert, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 247 days.

(21) Appl. No.: 14/943,545

(22) Filed: Nov. 17, 2015

(65) Prior Publication Data

US 2016/0069430 A1    Mar. 10, 2016

Related U.S. Application Data

(62) Division of application No. 13/768,311, filed on Feb. 15, 2013, now Pat. No. 9,217,493.

(51) Int. Cl.
| | |
|---|---|
| *F16H 3/62* | (2006.01) |
| *F16H 3/44* | (2006.01) |
| *F16H 37/06* | (2006.01) |
| *F16H 3/66* | (2006.01) |

(52) U.S. Cl.
CPC .............. *F16H 3/66* (2013.01); *F16H 3/44* (2013.01); *F16H 3/62* (2013.01); *F16H 2200/0065* (2013.01); *F16H 2200/0078* (2013.01); *F16H 2200/0086* (2013.01); *F16H 2200/2012* (2013.01); *F16H 2200/2046* (2013.01); *F16H 2200/2048* (2013.01)

(58) Field of Classification Search
CPC ................ F16H 2200/2012; F16H 2200/2048
See application file for complete search history.

(56) References Cited

U.S. PATENT DOCUMENTS

| | | | | |
|---|---|---|---|---|
| 3,282,131 | A * | 11/1966 | Smith ................ | F16H 3/66 475/276 |
| 3,398,606 | A * | 8/1968 | Utter ................. | F16H 3/66 475/276 |
| 3,956,946 | A * | 5/1976 | Murakami ........... | F16H 3/66 475/276 |
| 4,683,776 | A * | 8/1987 | Klemen .............. | F16H 3/66 475/286 |
| 6,955,627 | B2 | 10/2005 | Thomas et al. | |
| 6,960,149 | B2 | 11/2005 | Ziemer | |
| 7,163,484 | B2 | 1/2007 | Klemen | |

(Continued)

OTHER PUBLICATIONS

H. Benford, M. Leising, The Lever Analogy: A New Tool in Transmission Analysis, 1982, Society of Automotive Engineers, Inc. 810102, p. 429-437.

(Continued)

*Primary Examiner* — Tisha D Lewis  
(74) *Attorney, Agent, or Firm* — James Dottavio; Brooks Kushman P.C.

(57) ABSTRACT

A family of transmission gearing arrangements produces at least nine forward speed ratios and one reverse speed ratio by selective engagement of three shift elements in various combinations. Each disclosed transmission includes four planetary gear sets, three brakes, and either three or four clutches. One embodiment produces twelve forward speed ratios and two reverse speed ratios. Another embodiment produces thirteen forward speed ratios.

13 Claims, 8 Drawing Sheets

(56) References Cited

U.S. PATENT DOCUMENTS

| | | |
|---|---|---|
| 7,235,032 B2 | 6/2007 | Thomas et al. |
| 7,635,315 B2 | 12/2009 | Kamm et al. |
| 7,998,013 B2 | 8/2011 | Phillips et al. |
| 8,016,708 B2 | 9/2011 | Diosi et al. |
| 8,052,566 B2 | 11/2011 | Wittkopp et al. |
| 8,052,567 B2 | 11/2011 | Hart et al. |
| 8,113,984 B2 | 2/2012 | Wittkopp et al. |
| 8,177,674 B2 | 5/2012 | Baldwin |
| 8,187,139 B2 | 5/2012 | Baldwin |
| 8,210,982 B2 | 7/2012 | Gumpoltsberger et al. |
| 8,287,420 B2 | 10/2012 | Gumpoltsberger et al. |
| 8,303,455 B2 | 11/2012 | Gumpoltsberger et al. |
| 8,403,802 B2 | 3/2013 | Wittkopp et al. |
| 8,403,803 B2 | 3/2013 | Gumpoltsbergr et al. |
| 8,439,793 B2 | 5/2013 | Carey et al. |
| 8,460,151 B2 | 6/2013 | Wittkopp et al. |
| 8,474,342 B2 | 7/2013 | Thomas et al. |
| 2004/0102280 A1 | 5/2004 | Usoro et al. |
| 2011/0009228 A1 | 1/2011 | Bauknecht et al. |
| 2011/0045939 A1 | 2/2011 | Gumpoltsberger et al. |
| 2011/0045941 A1 | 2/2011 | Gumpoltsberger et al. |
| 2011/0045943 A1 | 2/2011 | Gumpoltsberger et al. |
| 2011/0251014 A1 | 10/2011 | Leesch et al. |
| 2012/0071289 A1 | 3/2012 | Wittkopp et al. |
| 2012/0165153 A1 | 6/2012 | Borgerson et al. |
| 2012/0172173 A1 | 7/2012 | Wittkopp et al. |
| 2015/0111689 A1* | 4/2015 | Beck ................ F16H 3/66 475/278 |
| 2016/0169341 A1* | 6/2016 | Cho ................. F16H 3/66 475/277 |

OTHER PUBLICATIONS

Chinese Office Action dated May 31, 2017 for corresponding Chinese Application No. 201410052566.9, 5 pages.

\* cited by examiner

MULTI-SPEED TRANSMISSION

CROSS-REFERENCE TO RELATED APPLICATIONS

This application is a division of U.S. application Ser. No. 13/768,311 filed Feb. 15, 2013, the disclosure of which is hereby incorporated in its entirety by reference herein.

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and shift elements configured to impose specified speed relationships among the rotating elements. Some speed relationships, called fixed speed relationships, are imposed regardless of the state of any shift elements. Other speed relationships, called selective speed relationships, are imposed only when particular shift elements are fully engaged. A linear speed relationship exists among an ordered list of rotating elements when i) the first and last rotating element in the group are constrained to have the most extreme speeds, ii) the speeds of the remaining rotating elements are each constrained to be a weighted average of the first and last rotating element, and iii) when the speeds of the rotating elements differ, they are constrained to be in the listed order, either increasing or decreasing. A discrete ratio transmission has a gearing arrangement that selectively imposes a variety of speed ratios between an input shaft and an output shaft.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a shift element when the shift element constrains them to rotate as a unit whenever it is fully engaged and they are free to rotate at distinct speeds in at least some other operating condition. A shift element that holds a rotating element against rotation by selectively connecting it to the housing is called a brake. A shift element that selectively couples two or more rotating elements to one another is called a clutch. Shift elements may be actively controlled devices such as hydraulically or electrically actuated clutches or brakes or may be passive devices such as one way clutches or brakes.

Figure 1:
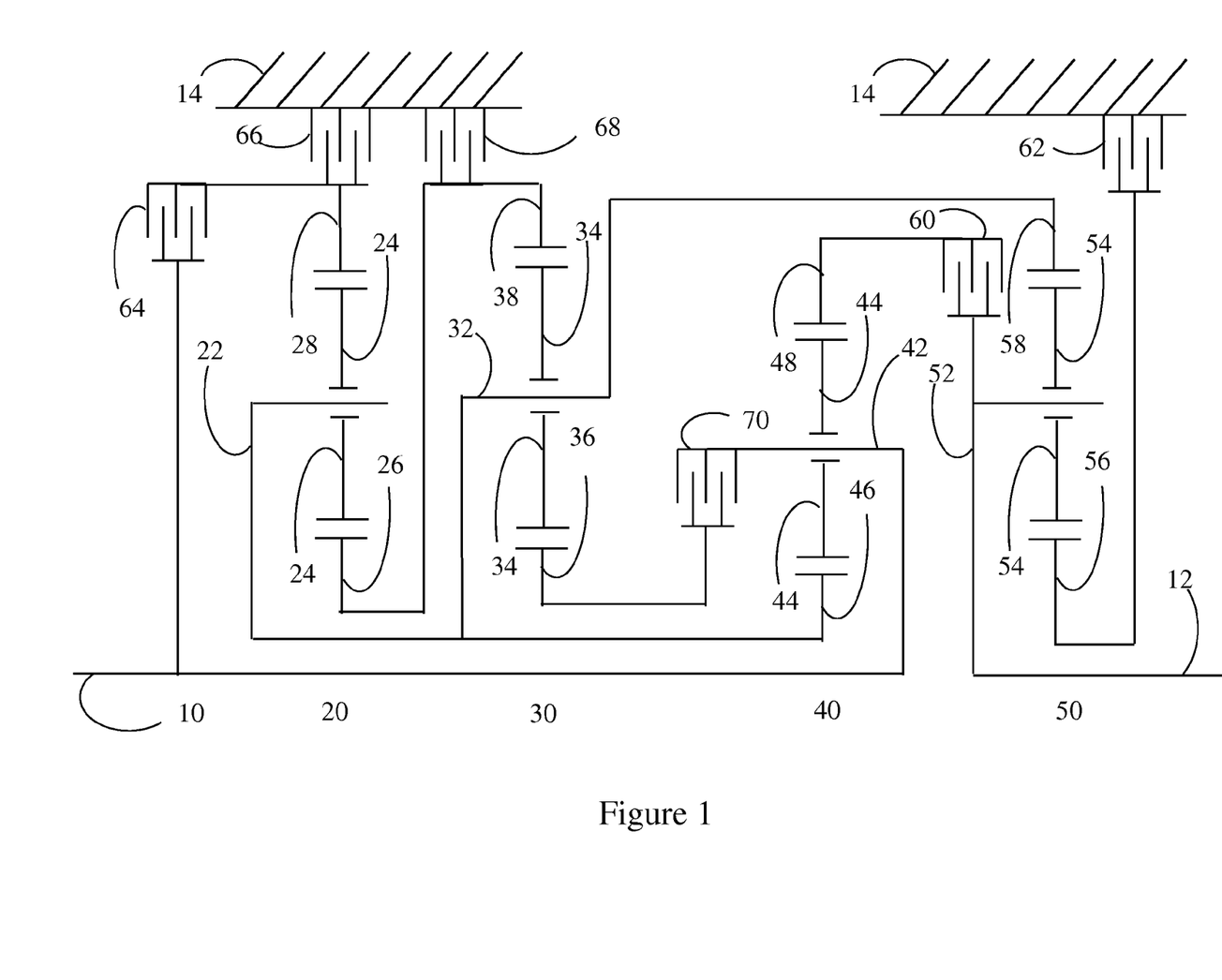
FIG. 1 is a schematic diagram of a first transmission gearing arrangement.

An example transmission is schematically illustrated in FIG. 1. The transmission utilizes four simple planetary gear sets 20, 30, 40, and 50. A planet carrier 22 rotates about a central axis and supports a set of planet gears 24 such that the planet gears rotate with respect to the planet carrier. External gear teeth on the planet gears mesh with external gear teeth on a sun gear 26 and with internal gear teeth on a ring gear 28. The sun gear and ring gear are supported to rotate about the same axis as the carrier. Gear sets 30, 40, and 50 are similarly structured.

A simple planetary gear set is a type of gearing arrangement that imposes a fixed linear speed relationship among the sun gear, the planet carrier, and the ring gear. Other known types of gearing arrangements also impose a fixed linear speed relationship among three rotating elements. For example, a double pinion planetary gear set imposes a fixed linear speed relationship between the sun gear, the ring gear, and the planet carrier.

A suggested ratio of gear teeth for each planetary gear set is listed in Table 1.

TABLE 1

| | |
|---|---|
| Ring 28/Sun 26 | 1.50 |
| Ring 38/Sun 36 | 2.00 |
| Ring 48/Sun 46 | 1.50 |
| Ring 58/Sun 56 | 1.50 |

In the transmission of FIG. 1, sun gear 26 is fixedly coupled to ring gear 38, carriers 22 and 32 are fixedly coupled to sun gear 46 and ring gear 58, carrier 42 is fixedly coupled to input shaft 10, and output shaft 12 is fixedly coupled to carrier 52. Ring gear 28 is selectively held against rotation by brake 66 and selectively coupled to input shaft 10 by clutch 64. Sun gear 26 and ring gear 38 are selectively held against rotation by brake 68. Input shaft 10 and carrier 42 are selectively coupled to sun gear 36 by clutch 70. Sun gear 56 is selectively held against rotation by brake 62. Finally, output shaft 12 and carrier 52 are selectively coupled to ring gear 48 by clutch 60. The combination of gear set 30 and clutch 70 selectively impose a linear speed relationship among ring gear 38, carrier 32, and input shaft 10.

As shown in Table 2, engaging the shift elements in combinations of three establishes nine forward speed ratios and one reverse speed ratio between input shaft 10 and output shaft 12. An X indicates that the shift element is required to establish the speed ratio. An (X) indicates the clutch can be applied but is not required. In 4th gear, clutch 60 and brake 62 establish the power flow path between input shaft 10 and output shaft 12. Any one of the remaining shift elements can also be applied. Applying clutch 64 ensures that all single and two step shifts from 4th gear can be accomplished by engaging only one shift element and releasing only one shift element. When the gear sets have tooth numbers as indicated in Table 1, the speed ratios have the values indicated in Table 2.

TABLE 2

| | 60 | 62 | 64 | 66 | 68 | 70 | Ratio | Step |
|---|---|---|---|---|---|---|---|---|
| Rev | | X | X | | | X | −3.33 | 67% |
| $1^{st}$ | | X | | | X | X | 5.00 | |
| $2^{nd}$ | | X | X | | X | | 2.78 | 1.80 |
| $3^{rd}$ | | X | X | | | X | 1.67 | 1.67 |
| $4^{th}$ | X | X | (X) | | | | 1.27 | 1.32 |
| $5^{th}$ | X | | X | | | X | 1.00 | 1.27 |
| $6^{th}$ | X | | X | | X | | 0.79 | 1.27 |
| $7^{th}$ | X | | | | X | X | 0.69 | 1.14 |
| $8^{th}$ | X | | | X | X | | 0.60 | 1.15 |
| $9^{th}$ | X | | | X | | X | 0.50 | 1.20 |

Gear sets 20 and 30, clutches 64 and 70, and brakes 66 and 68 form a gearing arrangement that produces a variety of speed ratios between input shaft 10 and carriers 22 and 32. Specifically, when clutch 70 and brake 66 are engaged, carriers 22 and 32 rotate in the opposite direction as input shaft 10. When brakes 66 and 68 are both engaged, carriers 22 and 32 are held against rotation. Engaging brake 68 in combination with clutch 70 or clutch 64 results in two underdrive ratios. Finally, when clutches 64 and 70 are both engaged carriers 22 and 32 rotate in unison with input shaft 10.

Figure 2:
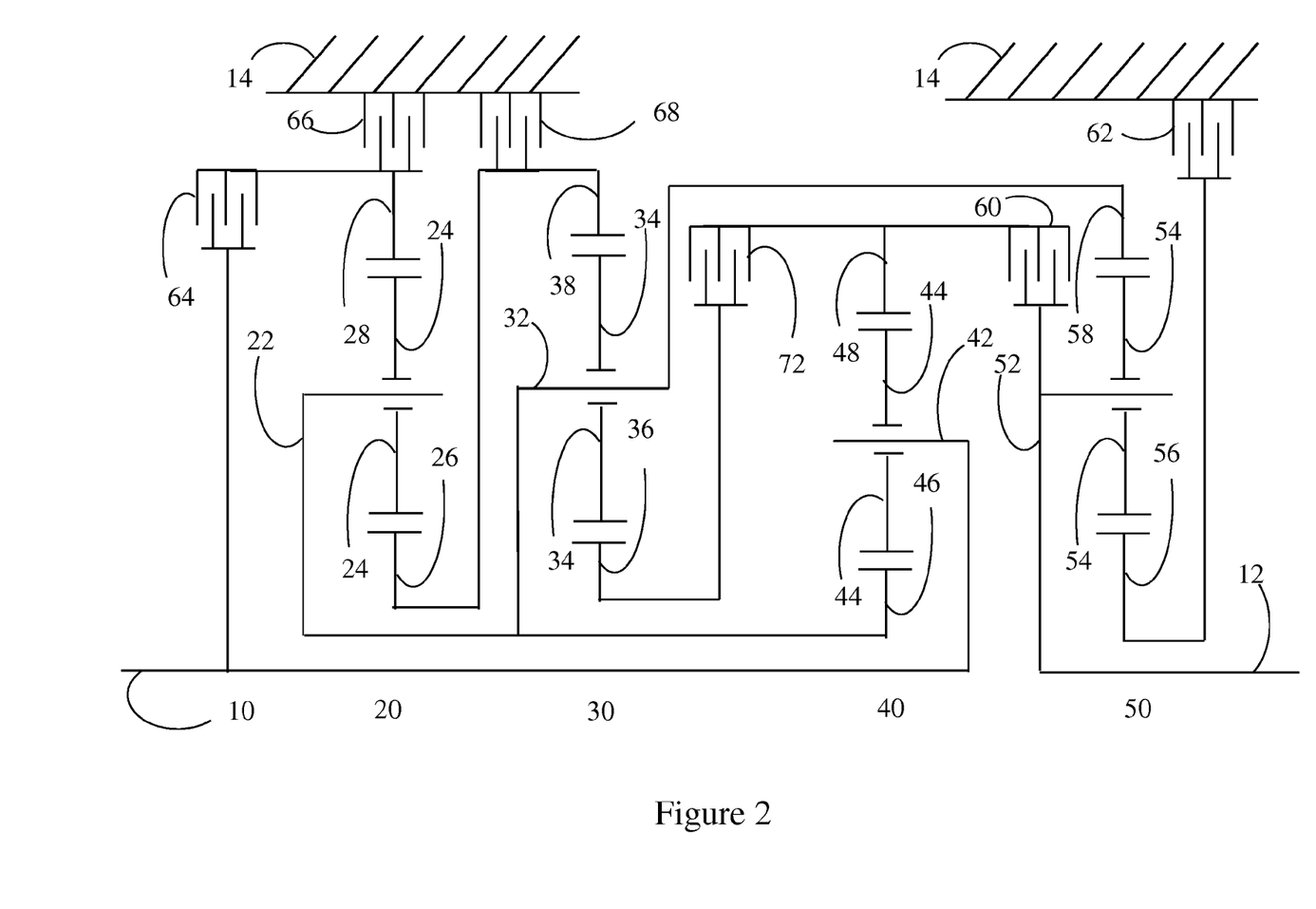
FIG. 2 is a schematic diagram of a second transmission gearing arrangement.

The transmission of FIG. 2 is like the transmission of FIG. 1 except that clutch 70 is deleted and sun gear 36 is selectively coupled to ring gear 48 by clutch 72. Suggested numbers of gear teeth for each planetary gear set is listed in Table 3.

TABLE 3

| | |
|---|---|
| Ring 28/Sun 26 | 2.00 |
| Ring 38/Sun 36 | 2.50 |
| Ring 48/Sun 46 | 1.50 |
| Ring 58/Sun 56 | 1.50 |

As shown in Table 4, engaging the clutches and brakes in combinations of three establishes nine forward speed ratios and one reverse speed ratio between input shaft 10 and output shaft 12. When the gear sets have tooth numbers as indicated in Table 3, the speed ratios have the values indicated in Table 4.

TABLE 4

| | 60 | 62 | 64 | 66 | 68 | 72 | Ratio | Step |
|---|---|---|---|---|---|---|---|---|
| Rev | | X | | X | | X | −3.33 | 67% |
| $1^{st}$ | | X | | | X | X | 4.17 | |
| $2^{nd}$ | | X | X | | X | | 2.50 | 1.67 |
| $3^{rd}$ | | X | X | | | X | 1.67 | 1.50 |
| $4^{th}$ | X | X | (X) | | | | 1.27 | 1.32 |
| $5^{th}$ | X | | X | | | X | 1.00 | 1.27 |
| $6^{th}$ | X | | X | | X | | 0.82 | 1.22 |
| $7^{th}$ | X | | | | X | X | 0.71 | 1.15 |
| $8^{th}$ | X | | | X | X | | 0.60 | 1.19 |
| $9^{th}$ | X | | | X | | X | 0.50 | 1.20 |

Figure 3:
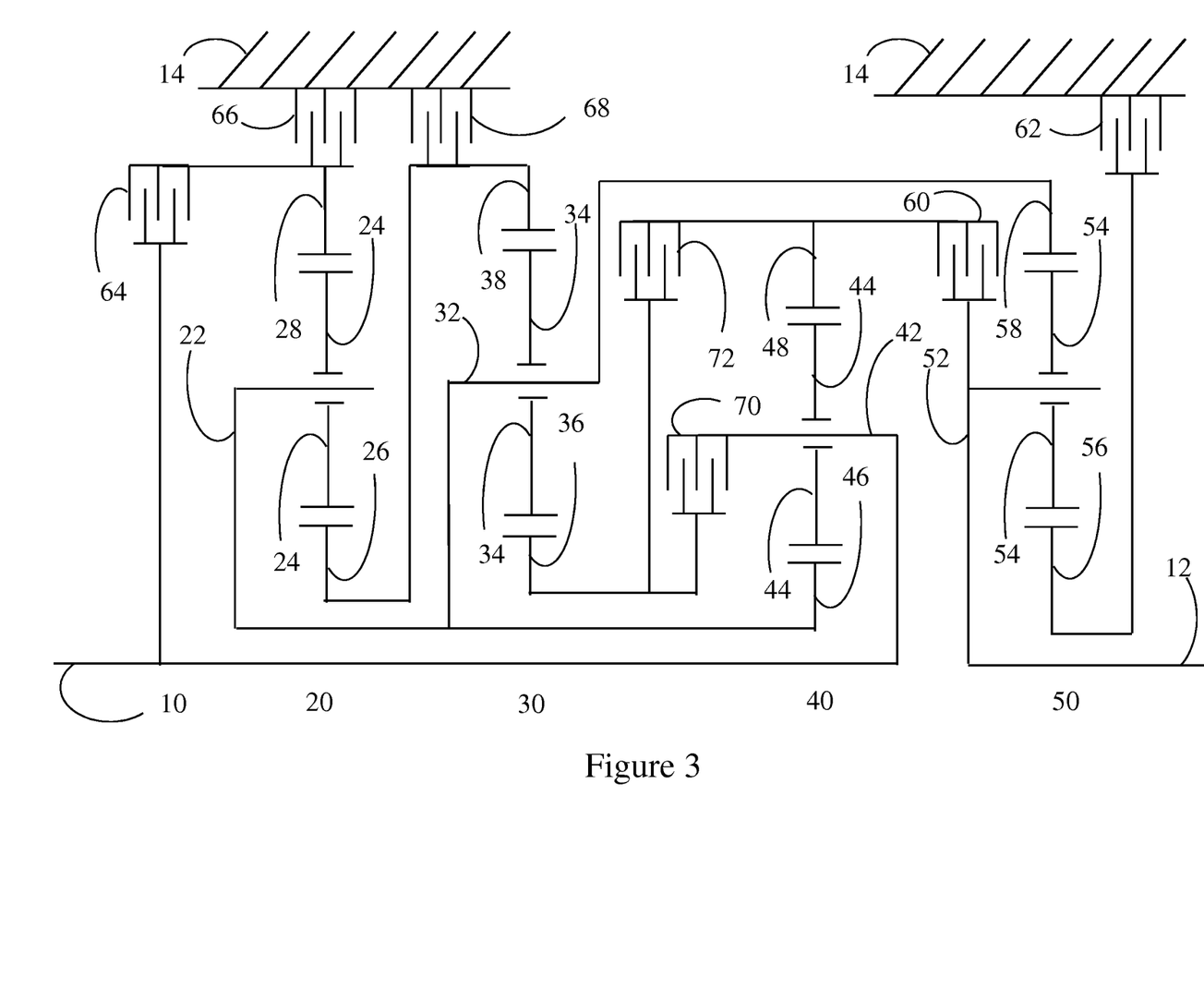
FIG. 3 is a schematic diagram of a third transmission gearing arrangement.

The transmission of FIG. 3 is like the transmissions of FIG. 1 and FIG. 2 except that both clutch 70 and 72 are present. Suggested numbers of gear teeth for each planetary gear set is listed in Table 5.

TABLE 5

| | |
|---|---|
| Ring 28/Sun 26 | 2.20 |
| Ring 38/Sun 36 | 1.80 |
| Ring 48/Sun 46 | 1.50 |
| Ring 58/Sun 56 | 1.50 |

As shown in Table 6, engaging the clutches and brakes in combinations of three establishes nine forward speed ratios and one reverse speed ratio between input shaft 10 and output shaft 12. When the gear sets have tooth numbers as indicated in Table 5, the speed ratios have the values indicated in Table 6.

TABLE 6

| | 60 | 62 | 64 | 66 | 68 | 70 | 72 | Ratio | Step |
|---|---|---|---|---|---|---|---|---|---|
| R1 | | X | | X | | X | | −4.93 | 106% |
| R2 | | X | | X | | | X | −2.29 | 2.15 |
| $1^{st}$ | | X | | | X | X | | 4.67 | |
| $2^{nd}$ | | X | | | X | | X | 3.47 | 1.35 |
| $3^{rd}$ | | X | X | | X | | | 2.42 | 1.43 |
| $4^{th}$ | | X | X | | | X | | 1.67 | 1.46 |
| $5^{th}$ | X | X | X | | | | | 1.27 | 1.32 |
| $6^{th}$ | X | | X | | | X | | 1.00 | 1.27 |
| $7^{th}$ | X | | X | | X | | | 0.83 | 1.21 |
| $8^{th}$ | X | | | | X | | X | 0.74 | 1.11 |
| $9^{th}$ | X | | | | X | X | | 0.70 | 1.06 |
| $10^{th}$ | X | | | X | X | | | 0.60 | 1.17 |
| $11^{th}$ | X | | | X | | X | | 0.53 | 1.14 |
| $12^{th}$ | X | | | X | | | X | 0.47 | 1.14 |

Figure 4:
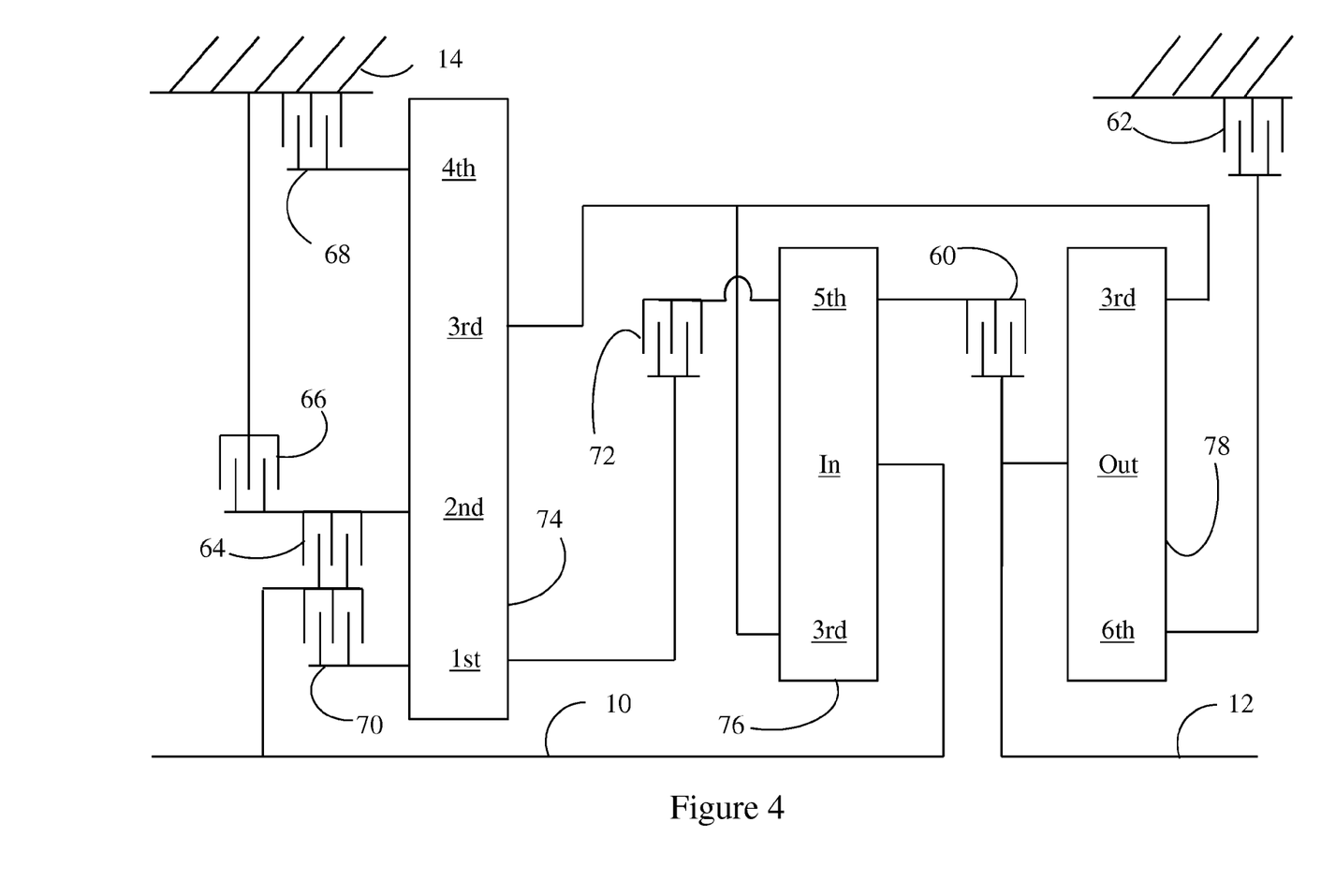
FIG. 4 is a lever diagram corresponding to the third transmission gearing arrangement.

FIG. 4 shows a lever diagram corresponding to the gearing arrangements of FIGS. 1-3. Levers 74, 76, and 78 represent gearing arrangements that impose fixedly linear speed relationships. Lever 74 corresponds to gear sets 20 and 30 and represents the linear speed relationship among four shafts that is imposed by these two gear sets. The first shaft corresponds to sun gear 36. The second shaft corresponds to ring gear 28. The third shaft corresponds to the combination of carrier 22, carrier 32, sun gear 46, and ring gear 58. The fourth shaft corresponds to the combination of sun gear 26 and ring gear 38. There are many gearing arrangements that impose this speed relationship. For example, any pair of planetary gear sets wherein two rotating elements of the first gear set are respectively fixedly coupled to two rotating elements of the second gear set will impose a linear speed relationship among four shafts. Lever 76 corresponds to gear set 40. The fifth shaft corresponds to ring gear 48. Lever 78 corresponds to gear set 50. The sixth shaft corresponds to sun gear 56.

Figure 5:
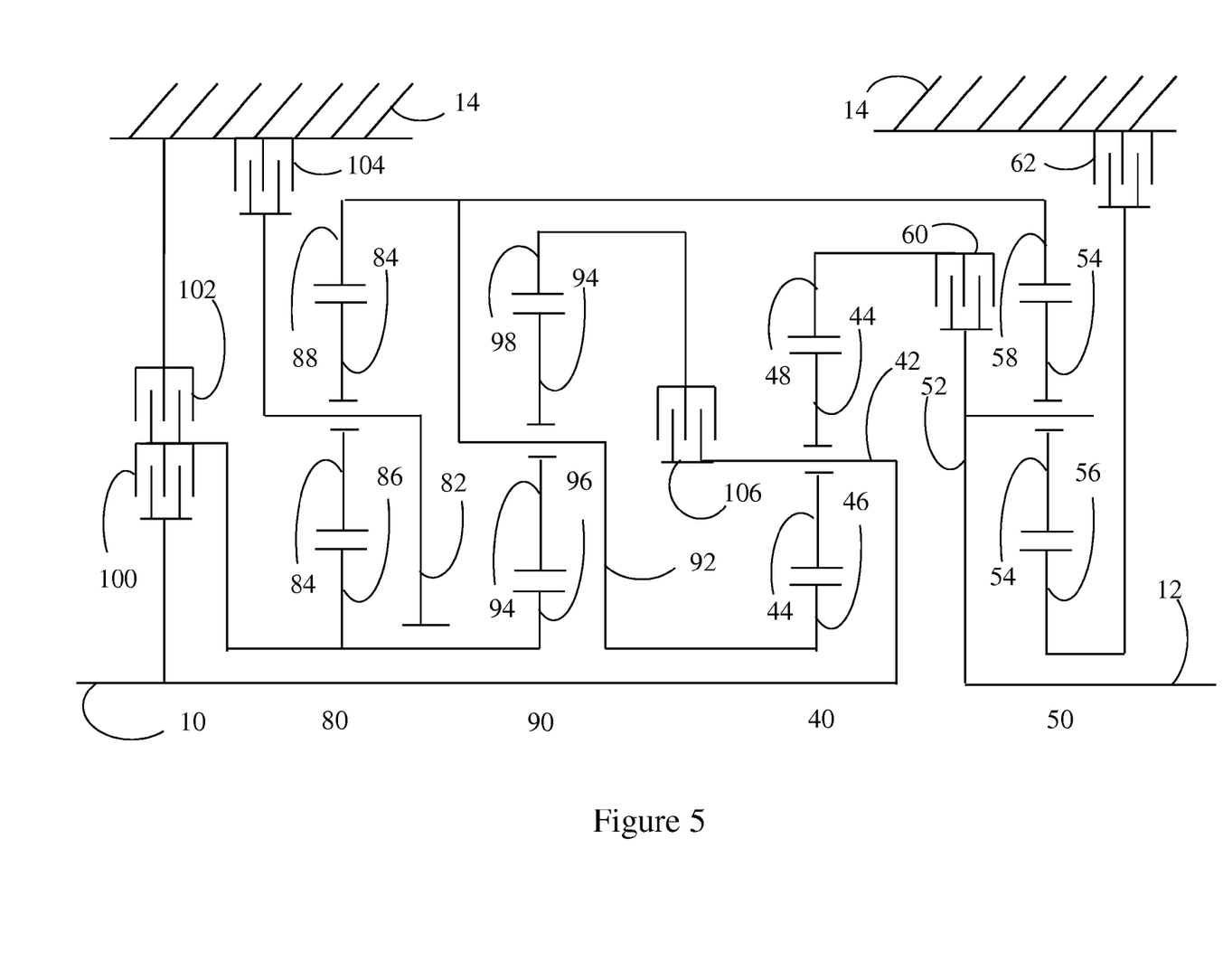
FIG. 5 is a schematic diagram of a fourth transmission gearing arrangement.

Another example transmission is schematically illustrated in FIG. 5. The transmission utilizes four simple planetary gear sets 80, 90, 40, and 50. A suggested ratio of gear teeth for each planetary gear set is listed in Table 7.

TABLE 7

| | |
|---|---|
| Ring 88/Sun 86 | 1.90 |
| Ring 98/Sun 96 | 2.00 |
| Ring 48/Sun 46 | 1.50 |
| Ring 58/Sun 56 | 1.50 |

In the transmission of FIG. 5, sun gear 86 is fixedly coupled to sun gear 96, ring gear 88 and carriers 92 are fixedly coupled to sun gear 46 and ring gear 58, carrier 42 is fixedly coupled to input shaft 10, and output shaft 12 is fixedly coupled to carrier 52. Sun gears 86 and 96 are selectively held against rotation by brake 102 and selectively coupled to input shaft 10 by clutch 100. Carrier 82 is selectively held against rotation by brake 104. Input shaft 10 and carrier 42 are selectively coupled to ring gear 98 by clutch 106. Sun gear 56 is selectively held against rotation by brake 62. Finally, output shaft 12 and carrier 52 are selectively coupled to ring gear 48 by clutch 60. The combination of gear set 80 and brake 104 selectively impose a speed relationship such that sun gear 86 and ring gear 88 rotate in opposite directions whenever brake 104 is engaged. The combination of gear set 90 and clutch 106 selectively impose a linear speed relationship among input shaft 10, carrier 92, and sun gear 96.

As shown in Table 8, engaging the shift elements in combinations of three establishes nine forward speed ratios and one reverse speed ratio between input shaft 10 and output shaft 12. An X indicates that the shift element is required to establish the speed ratio. An (X) indicates the clutch can be applied but is not required. In 4th gear, clutch 60 and brake 62 establish the power flow path between input shaft 10 and output shaft 12. Any one of the remaining shift elements can also be applied. Applying clutch 106 ensures that all single and two step shifts from 4th gear can be accomplished by engaging only one shift element and releasing only one shift element. When the gear sets have tooth numbers as indicated in Table 7, the speed ratios have the values indicated in Table 8.

TABLE 8

| | 60 | 62 | 100 | 102 | 104 | 106 | Ratio | Step |
|---|---|---|---|---|---|---|---|---|
| Rev | | X | X | | X | | -3.17 | 78% |
| 1st | | X | | | X | X | 4.08 | |
| 2nd | | X | | X | | X | 2.50 | 1.63 |
| 3rd | | X | X | | | X | 1.67 | 1.50 |
| 4th | X | X | | | | (X) | 1.27 | 1.32 |
| 5th | X | | | X | | X | 1.00 | 1.27 |
| 6th | X | | | X | | X | 0.82 | 1.22 |
| 7th | X | | | | X | X | 0.72 | 1.14 |
| 8th | X | | | X | X | | 0.60 | 1.20 |
| 9th | X | | X | | X | | 0.50 | 1.21 |

Gear sets 80 and 90, clutches 100 and 106, and brakes 100 and 102 form a gearing arrangement that produces a variety of speed ratios between input shaft 10 and the combination of ring gear 88 and carrier 92. Specifically, when clutch 100 and brake 104 are engaged, ring gear 88 and carrier 92 rotate in the opposite direction as input shaft 10. When brakes 102 and 104 are both engaged, ring gear 88 and carrier 92 are held against rotation. Engaging clutch 106 in combination with brake 102 or brake 104 results in two underdrive ratios. Finally, when clutches 100 and 106 are both engaged, ring gear 88 and carrier 92 rotate in unison with input shaft 10.

Figure 6:
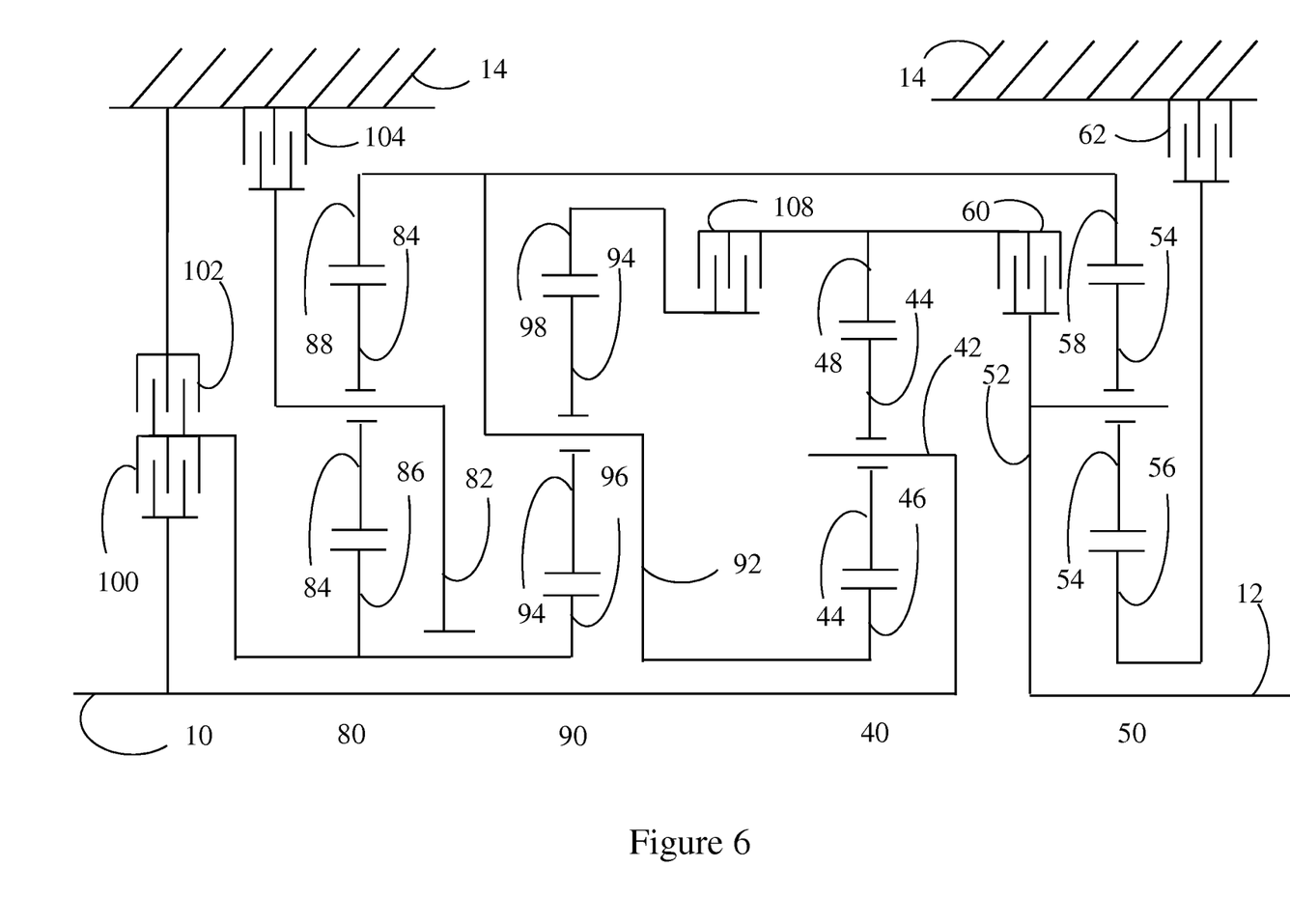
FIG. 6 is a schematic diagram of a fifth transmission gearing arrangement.

The transmission of FIG. 6 is like the transmission of FIG. 5 except that clutch 106 is deleted and ring gear 98 is selectively coupled to ring gear 48 by clutch 108. Suggested numbers of gear teeth for each planetary gear set is listed in Table 9.

TABLE 9

| | |
|---|---|
| Ring 88/Sun 86 | 2.30 |
| Ring 98/Sun 96 | 1.50 |
| Ring 48/Sun 46 | 1.50 |
| Ring 58/Sun 56 | 1.50 |

As shown in Table 10, engaging the clutches and brakes in combinations of three establishes nine forward speed ratios and one reverse speed ratio between input shaft 10 and output shaft 12. When the gear sets have tooth numbers as indicated in Table 9, the speed ratios have the values indicated in Table 10.

TABLE 10

| | 60 | 62 | 100 | 102 | 104 | 108 | Ratio | Step |
|---|---|---|---|---|---|---|---|---|
| Rev | | X | X | | X | | -3.83 | 99% |
| 1st | | X | | | X | X | 3.87 | |
| 2nd | | X | | X | | X | 2.33 | 1.66 |
| 3rd | | X | X | | | X | 1.67 | 1.40 |
| 4th | X | X | | | | (X) | 1.27 | 1.32 |
| 5th | X | | | X | | X | 1.00 | 1.27 |
| 6th | X | | | X | | X | 0.84 | 1.19 |
| 7th | X | | | | X | X | 0.73 | 1.16 |
| 8th | X | | | X | X | | 0.60 | 1.21 |
| 9th | X | | X | | X | | 0.51 | 1.17 |

Figure 7:
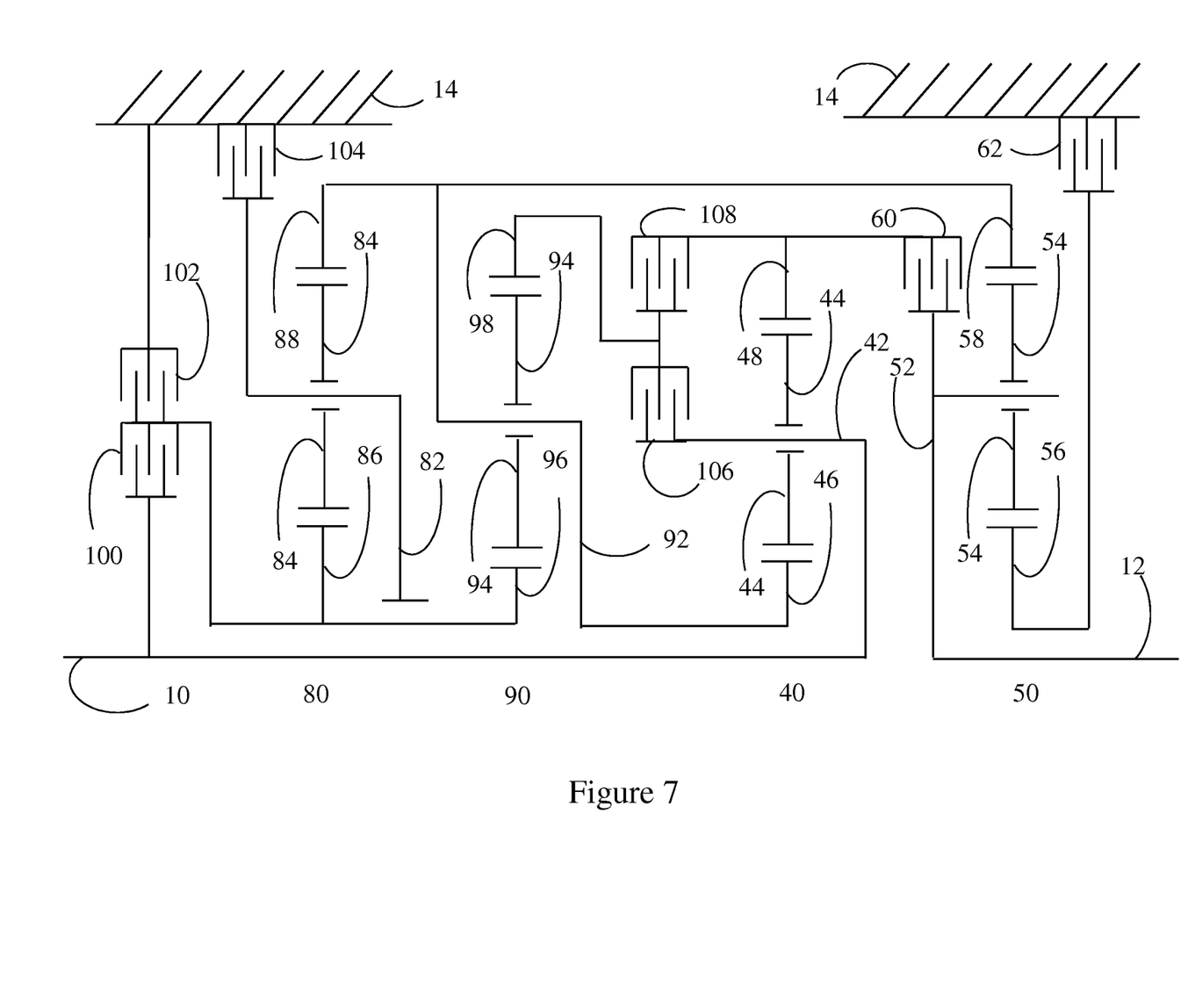
FIG. 7 is a schematic diagram of a sixth transmission gearing arrangement.

The transmission of FIG. 7 is like the transmissions of FIG. 5 and FIG. 6 except that both clutch 106 and 108 are present. Suggested numbers of gear teeth for each planetary gear set is listed in Table 11.

TABLE 11

| | |
|---|---|
| Ring 88/Sun 86 | 2.30 |
| Ring 98/Sun 96 | 1.50 |
| Ring 48/Sun 46 | 1.50 |
| Ring 58/Sun 56 | 1.50 |

As shown in Table 12, engaging the clutches and brakes in combinations of three establishes thirteen forward speed ratios and one reverse speed ratio between input shaft 10 and output shaft 12. When the gear sets have tooth numbers as indicated in Table 11, the speed ratios have the values indicated in Table 12.

TABLE 12

|      | 60 | 62 | 100 | 102 | 104 | 106 | 108 | Ratio | Step |
|------|----|----|-----|-----|-----|-----|-----|-------|------|
| Rev  |    | X  | X   |     | X   |     |     | −4.17 | 75%  |
| 1st  |    | X  |     |     | X   | X   |     | 5.56  |      |
| 2nd  |    | X  |     |     | X   |     | X   | 4.00  | 1.39 |
| 3rd  |    | X  |     | X   |     | X   |     | 2.78  | 1.44 |
| 4th  |    | X  |     | X   |     |     | X   | 2.33  | 1.19 |
| 5th  |    | X  | X   |     |     |     | X   | 1.67  | 1.40 |
| 6th  | X  | X  |     |     |     |     | (X) | 1.27  | 1.32 |
| 7th  | X  |    | X   |     |     |     | X   | 1.00  | 1.27 |
| 8th  | X  |    |     | X   |     |     | X   | 0.84  | 1.19 |
| 9th  | X  |    |     | X   |     | X   |     | 0.79  | 1.06 |
| 10th | X  |    |     |     | X   |     | X   | 0.72  | 1.10 |
| 11th | X  |    |     |     | X   | X   |     | 0.68  | 1.06 |
| 12th | X  |    |     | X   | X   |     |     | 0.60  | 1.14 |
| 13th | X  |    | X   |     | X   |     |     | 0.52  | 1.16 |

Figure 8:
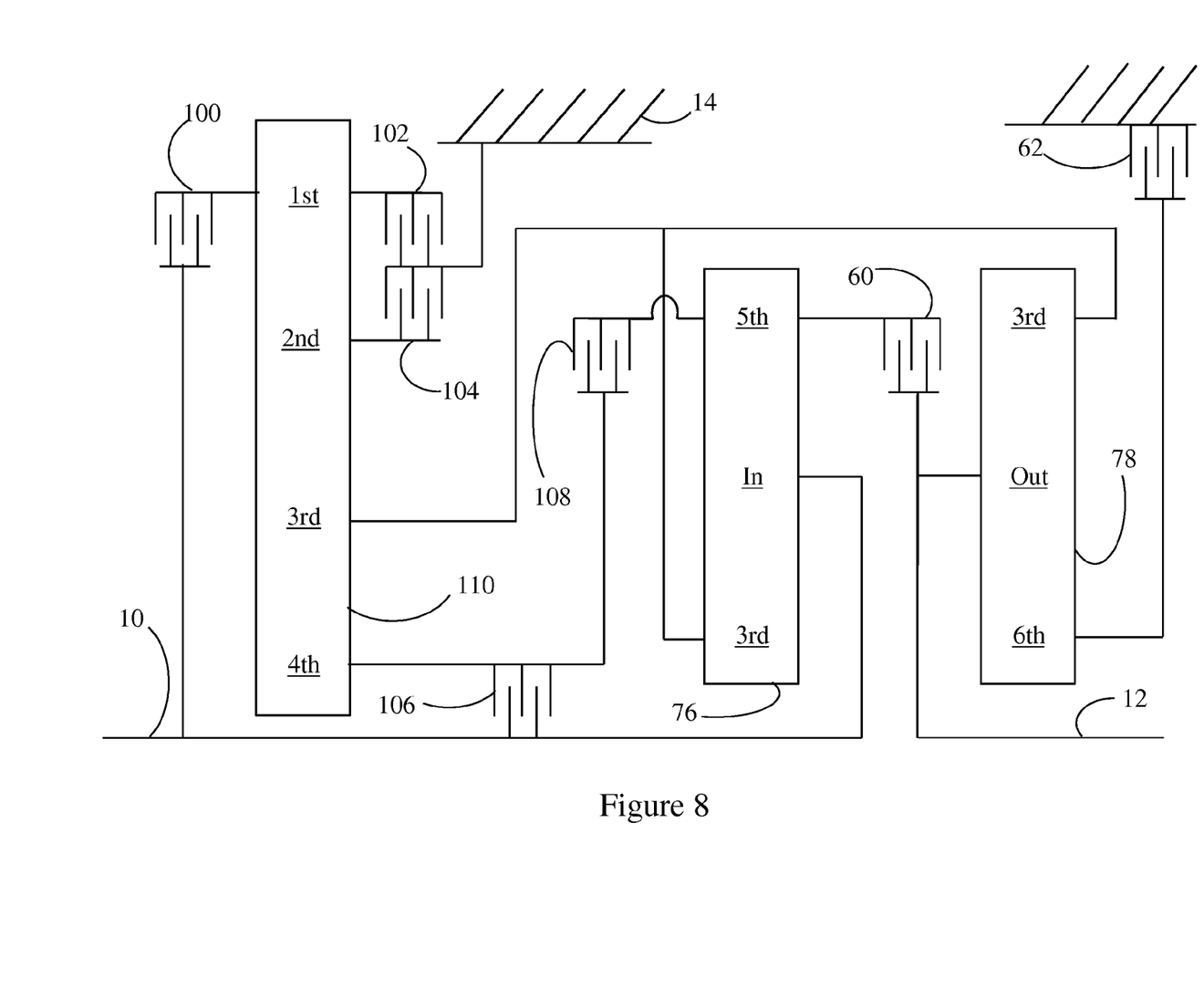
FIG. 8 is a lever diagram corresponding to the sixth transmission gearing arrangement.

FIG. 8 shows a lever diagram corresponding to the gearing arrangements of FIGS. 5-7. Levers 110, 76, and 78 represent gearing arrangements that impose fixedly linear speed relationships. Lever 110 corresponds to gear sets 80 and 90 and represents the linear speed relationship among four shafts that is imposed by these two gear sets. The first shaft corresponds to the combination of sun gear 86 and sun gear 96. The second shaft corresponds to carrier 82. The third shaft corresponds to the combination of ring gear 88, carrier 92, sun gear 46, and ring gear 58. The fourth shaft corresponds to ring gear 98. As discussed above, many known gearing arrangements impose this speed relationship. Lever 76 corresponds to gear set 40. The fifth shaft corresponds to ring gear 48. Lever 78 corresponds to gear set 50. The sixth shaft corresponds to sun gear 56.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
   an input shaft, an output shaft, and first, second, third, fourth, fifth, and sixth shafts;
   a first gearing arrangement configured to fixedly impose a linear speed relationship among the first shaft, the second shaft, the third shaft, and the fourth shaft;
   a second gearing arrangement configured to fixedly impose a linear speed relationship among the third shaft, the input shaft, and the fifth shaft;
   a third gearing arrangement configured to fixedly impose a linear speed relationship among the third shaft, the output shaft, and the sixth shaft;
   a first clutch configured to selectively couple the output shaft to the fifth shaft;
   a second clutch configured to selectively couple the input shaft to the first shaft;
   a first brake configured to selectively hold the sixth shaft against rotation;
   a second brake configured to selectively hold the first shaft against rotation; and
   a third brake configured to selectively hold the second shaft against rotation.

2. The transmission of claim 1 further comprising a third clutch configured to selectively couple the fourth shaft to the input shaft.

3. The transmission of claim 2 further comprising a fourth clutch configured to selectively couple the fourth shaft to the fifth shaft.

4. The transmission of claim 1 further comprising a third clutch configured to selectively couple the fourth shaft to the fifth shaft.

5. The transmission of claim 1 wherein the first gearing arrangement comprises:
   a first simple planetary gear set having a first sun gear fixedly coupled to the first shaft, a first ring gear fixedly coupled to the third shaft, a first planet carrier fixedly coupled to the second shaft, and at least one planet gear supported for rotation on the first planet carrier and in continuous meshing engagement with the first sun gear and the first ring gear; and
   a second simple planetary gear set having a second sun gear fixedly coupled to the first shaft, a second ring gear fixedly coupled to the fourth shaft, a second planet carrier fixedly coupled to the third shaft, and at least one planet gear supported for rotation on the second planet carrier and in continuous meshing engagement with the second sun gear and the second ring gear.

6. A transmission comprising:
   first, second, third, and fourth shafts;
   an input shaft;
   an output shaft;
   a first gearing arrangement configured to selectively constrain the first shaft and the second shaft to rotate in opposite directions;
   a second gearing arrangement configured to fixedly impose a linear speed relationship among the second shaft, the input shaft, and the third shaft;
   a third gearing arrangement configured to fixedly impose a linear speed relationship among the second shaft, the output shaft, and the fourth shaft;
   a first clutch configured to selectively couple the output shaft to the third shaft;
   a second clutch configured to selectively couple the input shaft to the first shaft;
   a first brake configured to selectively hold the fourth shaft against rotation; and
   a second brake configured to selectively hold the first shaft against rotation.

7. The transmission of claim 6 further comprising a fourth gearing arrangement configured to selectively impose a linear speed relationship among the input shaft, the second shaft, and the first shaft.

8. The transmission of claim 6 further comprising a fourth gearing arrangement configured to selectively impose a linear speed relationship among the third shaft, the second shaft, and the first shaft.

9. A transmission comprising:
first, second, third, and fourth planetary gearsets wherein suns of the first and second gearsets are fixedly coupled,
a ring of the first gearset, a carrier of the second gearset, a sun of the third gearset, and a ring of the fourth gearset are fixedly coupled,
an input and a carrier of the third gearset are fixedly coupled, and
an output and a carrier of the fourth gearset are fixedly coupled.

10. The transmission of claim 9 further comprising:
a first clutch configured to selectively couple the input to the suns of the first and second gearsets;
a second clutch configured to selectively couple the output to a ring of the third gearset;
a first brake configured to selectively hold the suns of the first and second gearsets against rotation;
a second brake configured to hold a carrier of the first gearset against rotation; and
a third brake configured to selectively hold a sun of the fourth gearset against rotation.

11. The transmission of claim 10 further comprising:
a third clutch configured to selectively couple a ring of the second gearset to the carrier of the third gearset.

12. The transmission of claim 11 further comprising:
a fourth clutch configured to selectively couple the ring of the second gearset to the ring of the third gearset.

13. The transmission of claim 10 further comprising:
a third clutch configured to selectively couple a ring of the second gearset to the ring of the third gearset.

* * * * *